J. W. FIKE.
LIFE-PRESERVER.
No. 175,828.   Patented April 11, 1876.
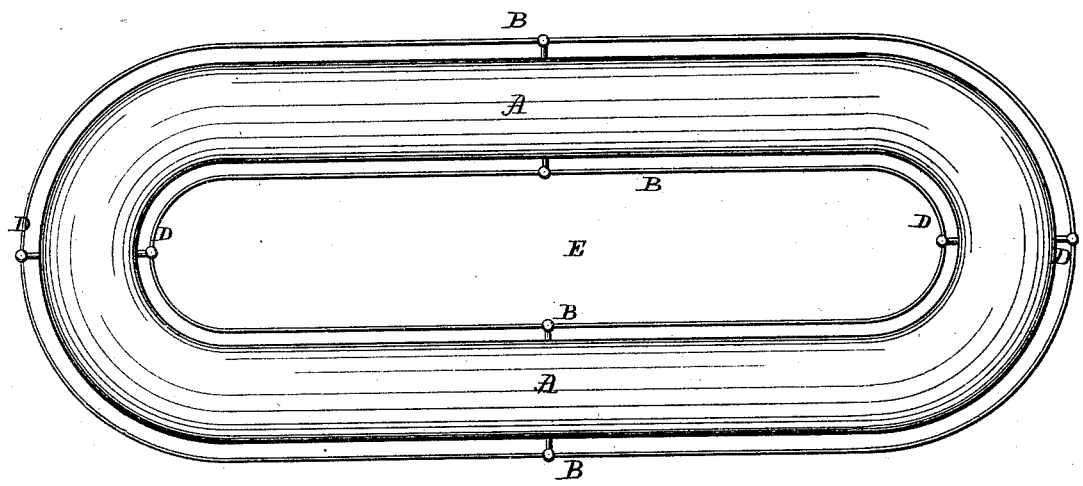
Witnesses:   Inventor:

UNITED STATES PATENT OFFICE.

JOHN W. FIKE, OF CLINTON, MISSOURI.

IMPROVEMENT IN LIFE-PRESERVERS.

Specification forming part of Letters Patent No. 175,828, dated April 11, 1876; application filed February 8, 1876.

*To all whom it may concern:*

Be it known that I, JOHN W. FIKE, of Clinton, in the county of Henry and State of Missouri, have invented a new and useful Improvement in Life-Preservers, which said improvement is fully set forth in the following specification:

The object of my invention is to construct an appliance or life-preserver which, when, cast upon the water, will float, and, at the same time, support the weight of many persons without sinking, and without being liable to upset or turn over. This is accomplished by the manner in which my life-preserver is constructed, it being constructed of any desirable material, and of any desired size, and in the manner following: It consists of two cylindrical tubes or bodies, which are placed parallel with each other, and joined at each end by a semicircular tube of the same size. Reference is here made to the accompanying drawing. Around the cylinders or tubes is attached a rod or hand-hold, firmly fixed to the same, both on the outside of the tubes, and also around the inner space between the two, the circumference of the tubes, and the distance which they are placed apart, to correspond to the length of the same.

I claim that when properly constructed according the specifications it is impossible to turn over or upset my life-preserver.

In the accompanying drawing, A is the tubes or cylinders; B, the rod or hand-hold; D, the semicircular end; E, the space within or between the two parallel tubes.

I claim as my invention—

A life-preserver composed of two cylindrical tubes parallel with each other, and joined at each end by a semicircular tube of the same size, and provided with the interior and exterior safety-rods B, substantially as and for the purpose described.

JOHN W. FIKE.

Witnesses:
M. A. FYKE,
JOHN S. GRAHAM.